(12) United States Patent
Cisek (10) Patent No.: US 6,953,542 B2
(45) Date of Patent: Oct. 11, 2005

(54) INTERLOCKING CLOSURE DEVICE

(75) Inventor: Ronald J. Cisek, Hinsdale, IL (US)

(73) Assignee: The Glad Products Company, Oakland, CA (US)

( * ) Notice: Subject to any disclaimer, the term of this patent is extended or adjusted under 35 U.S.C. 154(b) by 0 days.

(21) Appl. No.: 10/900,669

(22) Filed: Jul. 28, 2004

(65) Prior Publication Data

US 2004/0261229 A1 Dec. 30, 2004

Related U.S. Application Data

(62) Division of application No. 10/424,492, filed on Apr. 25, 2003, now Pat. No. 6,786,712, which is a division of application No. 09/932,742, filed on Aug. 17, 2001, now Pat. No. 6,594,872.

(51) Int. Cl.⁷ .............................................. B29C 69/00
(52) U.S. Cl. .................................. 264/210.2; 264/286
(58) Field of Search ........................ 264/210.2, 210.1, 264/280, 282, 283, 286

(56) References Cited

U.S. PATENT DOCUMENTS

| | | |
|---|---|---|
| 2,035,675 A | 3/1936 | Sipe |
| 3,557,413 A | 1/1971 | Engle |
| 4,419,159 A | 12/1983 | Herrington |
| 4,540,537 A | 9/1985 | Kamp |
| 4,561,109 A | 12/1985 | Herrington |
| 4,854,017 A | 8/1989 | Kamp |
| 4,859,259 A | 8/1989 | Scheibner |
| 4,941,238 A | 7/1990 | Clark |
| 4,944,072 A | 7/1990 | Robson |
| 5,053,091 A | 10/1991 | Giljam et al. |
| 5,070,584 A | 12/1991 | Porchia et al. |
| 5,106,566 A * | 4/1992 | McCree ....................... 264/280 |
| 5,140,727 A | 8/1992 | Dais et al. |
| 5,211,481 A | 5/1993 | Tilman |
| 5,363,540 A | 11/1994 | Porchia et al. |
| 5,411,777 A | 5/1995 | Steele et al. |
| 5,470,518 A * | 11/1995 | Dais et al. ................... 264/145 |
| 5,478,228 A | 12/1995 | Dais et al. |
| 5,509,734 A | 4/1996 | Ausnit |
| 5,564,834 A | 10/1996 | Porchia et al. |
| 5,588,187 A | 12/1996 | Swain |
| 5,617,770 A | 4/1997 | May |
| 5,647,100 A | 7/1997 | Porchia |
| 5,774,955 A | 7/1998 | Borchardt et al. |
| 5,878,468 A | 3/1999 | Tumic |
| 5,934,806 A | 8/1999 | Tomic et al. |
| 5,962,040 A | 10/1999 | Dais et al. |
| 6,009,603 A | 1/2000 | Gallagher |
| 6,026,761 A | 2/2000 | Parniske et al. |
| 6,217,215 B1 | 4/2001 | Tomic |
| 6,594,872 B2 * | 7/2003 | Cisek .......................... 24/401 |
| 6,786,712 B2 * | 9/2004 | Cisek .......................... 425/321 |

* cited by examiner

*Primary Examiner*—Mark Eashoo
(74) *Attorney, Agent, or Firm*—Thomas C. Feix (57) ABSTRACT

A closure device for a thermoplastic bag which includes two opposing, longitudinally extending interlockable male and female fastening strips having respective male and female closure elements or profiles that are deformed to interdigitate and produce an audible clicking sound and or tactile effect that is perceptible to the touch as the closure device is opened and closed. Interdigitation of the two profiles is achieved by cold forming the profiles while interlocked. The shape of the cold form is a stepped deflection of both profiles so that their shapes are generally congruent. The stepped deflections provide a change in the occlusion and peel force of the interlocking closure device thereby resulting in an audible clicking or popping sound as the closure device is opened and closed and a tactile effect that is perceptible to the touch as the closure device is closed.

1 Claim, 11 Drawing Sheets

INTERLOCKING CLOSURE DEVICE

This application is a divisional of Ser. No. 10/424,492 filed Apr. 25, 2003, now U.S. Pat. No. 6,786,712, which is a divisional of Ser. No. 09/932,742, filed Aug. 17, 2001, now U.S. Pat. No. 6,594,872 issued Jul. 22, 2003.

FIELD OF THE INVENTION

The present invention relates generally to interlocking closure devices for thermoplastic storage bags, and more particularly, to an interlocking closure device which produces an audible sound when the closure device is being open or closed. Further, the closure device provides a vibration or bumpy feel, which is tactile and readily perceptible to the touch when the closure device is closed.

BACKGROUND OF THE INVENTION

The use of closure devices for fastening storage containers, including plastic bags, is generally known. Furthermore, the manufacture of closure devices made of plastic materials is generally known to those skilled the in the art, as demonstrated by the numerous patents in this area.

A particularly well-known use for closure devices is in connection with flexible storage containers, such as plastic bags. In some instances, the closure device and the associated container are formed from thermoplastic materials, and the closure device and the sidewalls of the container are integrally formed by extrusion as a single piece. Alternatively, the closure device and sidewall of the container may be formed as separate pieces and then connected by heat sealing or any other suitable connecting process. In either event, such closure devices are particularly useful in providing closure means for retaining matter within the bag.

Conventional closure devices typically utilize a thermoplastic zipper in the form of mating fastening strips or closure elements, which are used to selectively seal the bag. The fastening strips comprise interlockable male and female profiles. With such closure devices, however, it is often difficult to determine whether the fastening strips are fully occluded. The problem addressed by the present invention pertains to the determination of closure or nonclosure of the zipper of a reclosable thermoplastic bag.

One technique for aiding in the determination of the state of zipper is to utilize a zipper that imparts a visual color change upon closure. Different colors may be utilized in each of the opposing zipper profiles to produce a third distinct color when interlocked. Zippers utilizing such a color change are seen in U.S. Pat. Nos. 4,186,786 and 4,285,105.

It is well understood that all thermoplastic zippers have an occlusion and peel force. It is also known that a desired audible and/or tactile effect can be achieved during opening or closure of the zipper by changing the occlusion and peel force along the length of the zipper. One technique for changing this force is to remove portions of one or both of the male and female zipper profiles such that there is a discontinuity in structure in those portions of the opposing profiles which contact each other upon interlockment of the zipper. Examples of zippers having closure profiles with portions removed are disclosed in U.S. Pat. No. 5,070,584 to Dais et al. and U.S. Pat. No. 5,647,100 to Porchia et al.

In U.S. Pat. No. 5,070,584, at least one of the zipper profiles includes indentions within and intermittently along its length along a surface of it adjacent a portion of the opposing profile. The indentions are present in and along a part of the zipper profile interlockable with a part of the opposing zipper profile wherein both of the interlockable parts are longitudinally extending. The indentions and the surfaces which define or bound the indentions of the part of the zipper profile are adjacent the part of the opposing zipper profile with which it is interlocked. This patent further discloses that the part of the zipper profile having indentions therein is substantially free of interdigitation with the part of the opposing zipper profile with which it is interlockable. According to this patent document, being "substantially free of interdigitation" means that the cavities defined by the indentions within the part are substantially free of intrusion by portions of the part of the opposing profile. The indentions in the bulbous head of the male closure profile provide the structural discontinuity in the region of interlocking contact with the female closure profile that creates the desired audible clicking sound and/or tactile effect.

In accordance with the preferred method of making the above-described audible/tactile zippers, a rotary punch apparatus is used to laterally punch out segments of the bulbous head of the male closure profile to form indentations along its length. The punching is lateral as it occurs in a direction that is perpendicular to the extension of the bulbous head. In the final assembly of the zipper bag, the interlocking male and female profiles are then brought together in a separate step before being attached to the opposing bag side panels. A method of making an audible/tactile zipper closure wherein the interlocking closure profiles are made structurally discontinuous while interlocked to each other would be desirable as it would reduce the number of steps in the final assembly of the zipper bag.

The punching technique described above also generally requires careful attention to profile positioning and alignment of the zipper profile through the deforming apparatus to ensure against removal of too much profile material, which otherwise results in the increased likelihood or incidence of liquid leakage through the interlocked zipper. The zipper profiles disclosed in the '584 patent have enjoyed much commercial success. However, there still exists a need for alternative and improved thermoplastic closure members that impart a vibration perceptible to the touch, and emanate an audible clicking sound along the closure member's length when being closed or interlocked so that the fact of closure can be confirmed by a nonvisual means, i.e., by sound and feel.

Accordingly, it is desired to provide a reclosable bag having an improved closure member that imparts a vibration perceptible to the touch, and, further preferably, emanates an audible clicking sound continually along the closure member from end to end; and it is desired to provide a method for production of the reclosable bag wherein material is not removed from the closure region such that leak resistance through the closure is improved.

SUMMARY OF THE INVENTION

The present invention provides a closure device for a thermoplastic bag which includes two opposing, longitudinally extending interlockable male and female fastening strips having respective male and female closure elements or profiles that are deformed to interdigitate and produce an audible clicking sound and or tactile effect that is perceptible to the touch as the closure device is opened and closed. Interdigitation of the two profiles is achieved by cold forming the profiles while interlocked. The shape of the cold form is a stepped deflection of both profiles so that their shapes are generally congruent. The stepped deflections provide a change in the occlusion and peel force of the interlocking closure device thereby resulting in an audible clicking or popping sound as the closure device is opened and closed and a tactile effect that is perceptible to the touch as the closure device is closed.

In accordance with an advantageous aspect of the invention, the compressive force across the stepped deflection is graduated such that the greatest amount of compression is experienced at the outermost or uppermost portion of the closure profiles. In this way, leak resistance through the closure device is improved and the desired audible and/or tactile effects are still achieved.

Methods and apparatus which incorporate the features described above and which are effective to function as described above constitute further, specific objects of the invention. Other objects and advantages of the invention will become apparent upon reading the following description and upon reference to the drawings.

BRIEF DESCRIPTION OF THE DRAWINGS

For a more complete understanding of this invention reference should now be had to the embodiments illustrated in greater detail in the accompanying drawings and described below by ways of examples of the invention. In the drawings.

DESCRIPTION OF THE PREFERRED EMBODIMENTS

The present invention provides interlocking closure devices with specially formed mating closure elements that produce an audible sound and/or provide a tactile sensation upon occlusion and deocclusion of the closure elements. As used herein and as generally understood in the art, the terms "male" and "female" closure elements refer to closure elements wherein the element that interlocks into the other closure element is referred to as the "male closure element" and the other element is referred to as the "female closure element." In addition, the terms "outermost" and/or "uppermost" webs refer to leg or stem portions of the male and female closure elements located nearest to the open top end of the bag. Conversely, the terms "innermost" and/or "lowermost" webs refer to leg or stem portions of the male and female closure elements located nearest to the closed bottom end portion of the bag.

Figure 1:
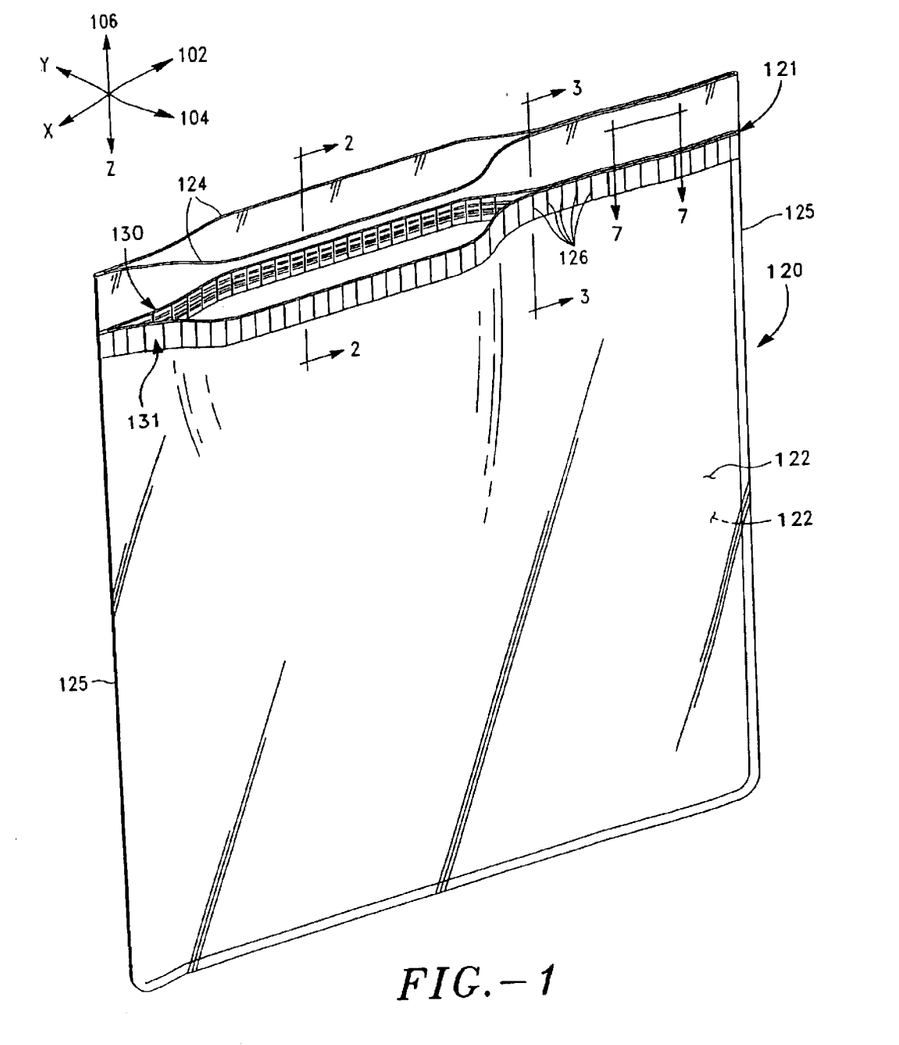
FIG. 1 is a perspective view of a container in the form of a thermoplastic bag having an interlocking closure device in accordance with the present invention.

FIG. 1 illustrates a container according to the present invention in the form of a thermoplastic bag 120 having a sealable interlocking closure device 121. The bag 120 includes sidewalls 122 joined at seams 125 to form a compartment sealable by means of the closure device 121. The sidewalls 122 extend beyond the closure device 121 to provide mouth portions 124 to simplify opening of the closure device 121. The closure device 121 or "zipper", a common term of art by which the closure device is also known as, is preferably continuous in length across the open top of the bag 120.

Generally, the closure device 121 comprises fastening strips arranged to be interlocked over a predetermined length. The fastening strips include male and female closure elements or profiles that interlock and interdigitate with each other. Typically the closure force of the closure elements is cycled intermittently over the length of the closure device between a low closure force and a high closure force, with the changes in closure force being produced in turn by making a series of intermittent and substantially congruent structural discontinuities in each of the contact surfaces of the male and female closure elements while interlocked to each other. These structural discontinuities are manifest in the form of first series of valleys or indentations in the contact side of one of the male or female closure elements and a second series of peaks or protrusions in the contact side of the opposing male or female closure element. The process for forming the structural discontinuities in the two parts is preferably done by cold forming a series of stepped deflections in the two pieces while interlocked such that the peaks of one closure element are in substantially congruent and interdigitating relation with the valleys of the second closure element. Preferably, the peaks are slightly out of phase with the valleys to provide a desired degree of interference contact therebetween. It is the interference contact that produces the audible popping or clicking sound and tactile sensation when the closure elements are occluded and deoccluded. The stepped deflections produced by the cold form process are indicated generally by reference numeral 126.

Figure 2:
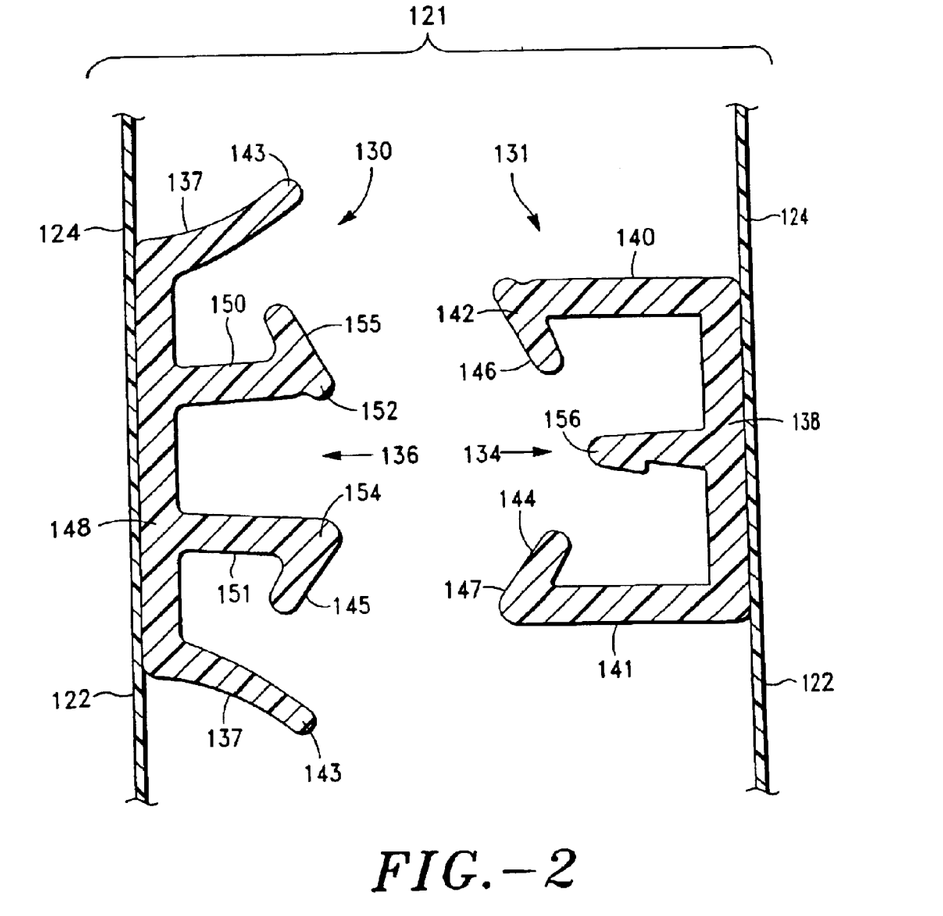
FIG. 2 is an enlarged cross-sectional view taken along reference line 2—2 of FIG. 1.

More specifically, in accordance with one embodiment of the present invention, there is shown in FIG. 2 a cross section view through the closure device 121 at a region free of any stepped deflection. The closure device comprises male and female fastening strips 130, 131. The female fastening strip 131 includes a female closure element 134. The male fastening strip 130 comprises a male closure element 136 for engaging the female closure element 134.

The fastening strips 130, 131 have a longitudinal X axis 102 and a transverse Y axis 104 which is perpendicular to the longitudinal X axis 102. Also, the fastening strips have a vertical Z axis 106 which is perpendicular to the longitudinal X axis 102 and the vertical Z axis is perpendicular to the transverse Y axis 104.

Figure 3:
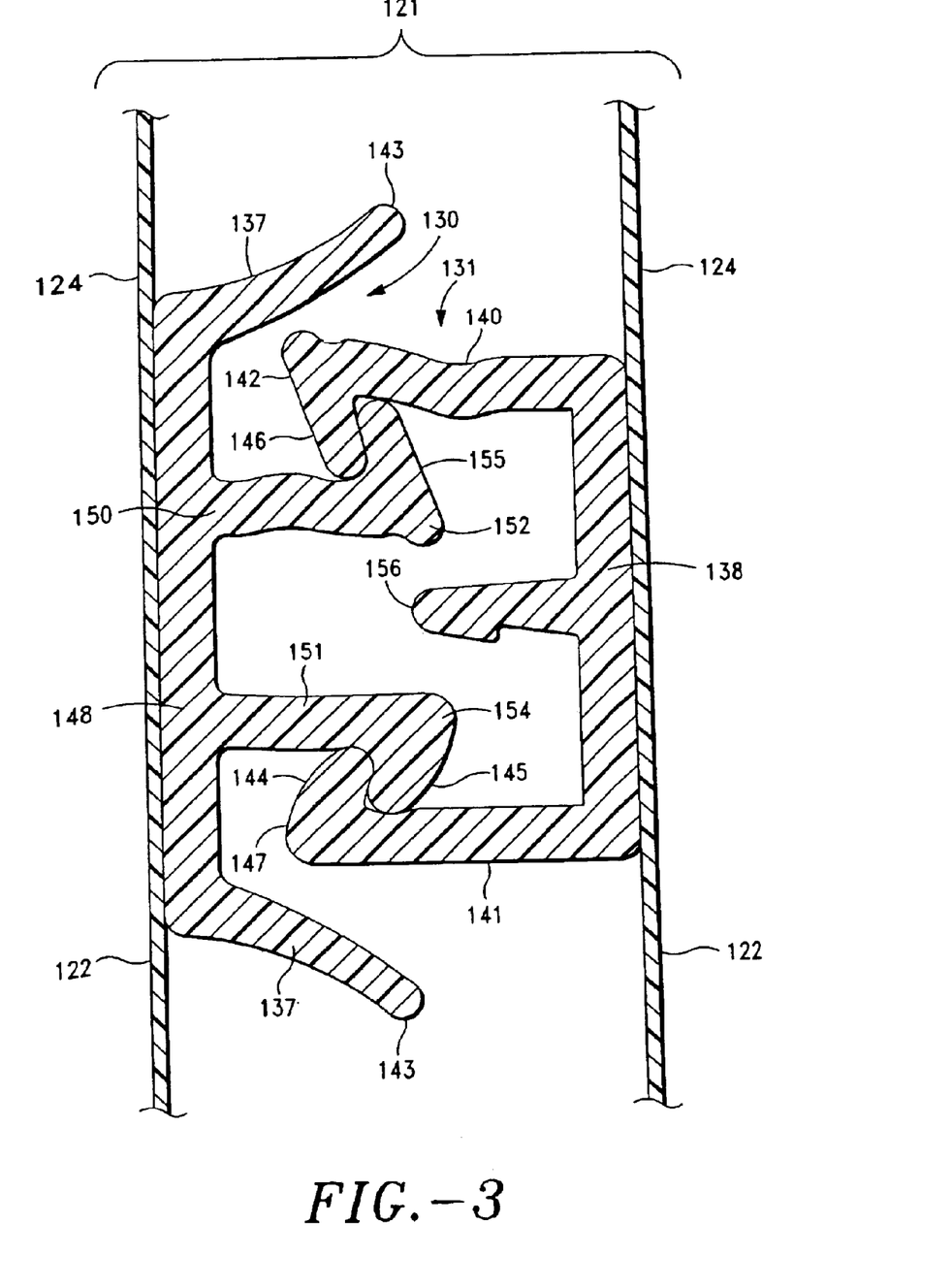
FIG. 3 is an enlarged cross-sectional view taken along reference line 3—3 of FIG. 1.
Figure 5:
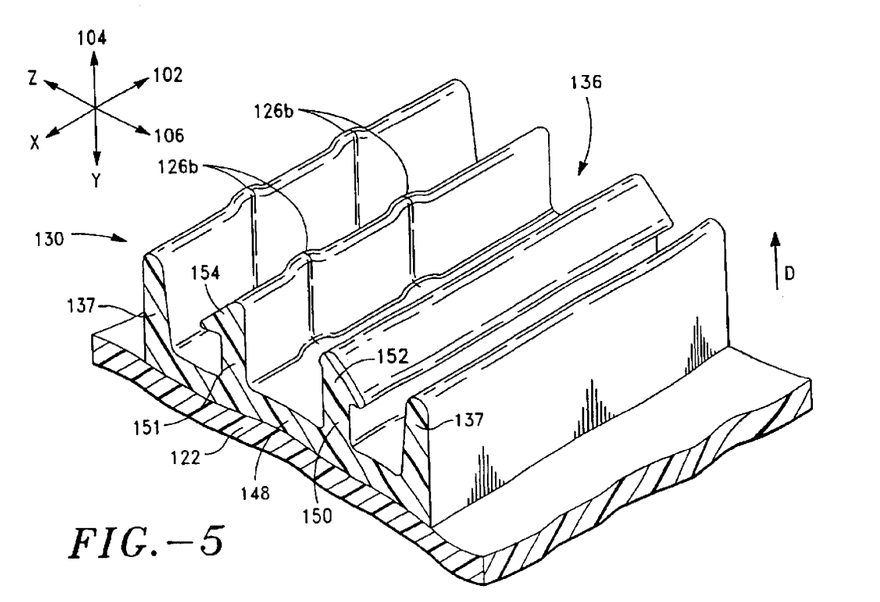
FIG. 5 is an enlarged isometric fragmentary view partly in section of the male closure element of the interlocking closure device shown in FIG. 1.

The female closure element 134 may include a base portion 138 and may include a pair of spaced-apart parallely disposed webs 140, 141 extending from the base portion 138. The webs 140, 141 may include female hook closure portions 142, 144 extending from the webs 140, 141 respectively, and facing towards each other. The female hook portions 142, 144 may include guide surfaces 146, 147 which serve to guide the hook portions 142, 144 for occluding with the male hook portions of a mating closure element. The male closure element 136 may include a base portion and may include a pair of spaced-apart, parallely disposed webs 150, 151 extending from the base portion 148. The webs 150, 151 may include male hook closure portions 152, 154 extending from the webs 150, 151 respectively and facing away from each other. The male hook portions 152, 154 may include guide surfaces 145, 155, which generally serve to guide the hook portions 152, 154 for occlusion with the female hook portions 142, 144 of the mating female closure element. The guide surface 145 may also have a rounded crown surface. In addition, the hook portions may be designed so that the hook portions 144, 154 adjacent the interior of the container provide a greater resistance to opening of the closure device. The male fastening strip may include a pair of male wings 137 spaced-apart on the male fastening strip on each side of the male closure element 136. The male wings 137 are flexible and extend from the base of the fastening strip. In accordance with a preferred embodiment, each wing terminates in an end portion 143 which projects outwardly from the wing 137. Alternatively, the end portions 143 do not project outwardly as shown in FIGS. 2 and 3 but instead are aligned with the wings 137 as shown in FIG. 5. The female fastening strip 131 may also include a color change enhancement member 156. In similar fashion to the male fastening strip 130, the female fastening strip 131 may be provided with a pair of female wings (not shown) spaced-apart on the female fastening strip on each side of the female closure element 134.

FIG. 3 is a cross section view of the closure device showing an occluded state of the closure elements 134, 136 through a region corresponding to a stepped deflection 126. In this view, the outermost or uppermost webs 140 and 150 of the fastening strips 131 and 130, respectively, are compressed as a result of the cold form stepped deflection 126 (see FIG. 1). The compression of webs 140 and 150 is concentrated generally along the transverse Y axis 104. Although not readily apparent in this view, the innermost or lowermost webs 141 and 151 of respective fastening strips 131 and 130 may also be compressed.

Closure devices of the present invention preferably are substantially leakproof. For example, surfaces of the interlockable male and female closure elements preferably form a contiguous or snug fit with each other along the entire length of the closure device. In the preferred embodiment only the outer most webs 140 and 150 are compressed as this significantly minimizes the possibility of leakage through the closure device.

The amount of compression imparted to the webs 140, 150, 141, 151 will depend ultimately on how accurate the deforming apparatus is set initially. The deforming apparatus and method of producing the stepped deflections with selectable compression force is discussed in more detail below with reference to FIGS. 11–14.

Figure 4:
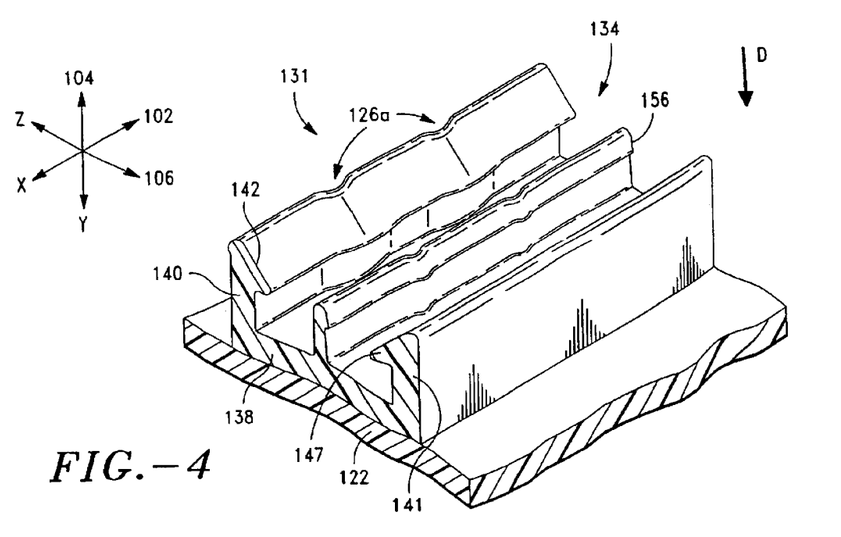
FIG. 4 is an enlarged isometric fragmentary view partly in section of the female closure element of the interlocking closure device shown in FIG. 1.

FIG. 4 shows a perspective view of a portion of the female closure element 134. The stepped deflections 126 imparted to the interlocking closure device 121 result in a series of intermittent valleys or indentations 126a being formed in the closure contact area of the outermost female hook closure portion 142. The portions of the web 140 underlying the valleys 126a are compressed generally along the transverse Y axis 104. Note, the compression is more readily apparent in FIG. 3. Arrow D generally designates the direction of the applied deflection force in this Figure (FIG. 4) and also in FIGS. 5 and 9–10.

FIG. 5 shows a perspective view of a portion of the male closure element 136. The stepped deflections 126 imparted to the interlocking closure device 121 result in a series of intermittent peaks or protrusions 126b being formed in the closure contact area of the outermost male hook closure portion 154. The portions of the web 151 underlying the peaks 126b are compressed.

As noted above, for best leakproofing results it is preferred that the compression be concentrated to the outermost or uppermost webs 151 and 140 of the respective male and female closure elements 136 and 134. The outermost or upper most wing 137 of the male closure element 136 may also be compressed. The amount of compression on the wing 137 will depend on how tall and how straight up the wing 137 extends initially. In other words, there would be no compression if the wing tip has nothing to abut against during cold forming of the stepped deflections In this embodiment, any compression of the wing 137 will not make any appreciable contribution to the desired audible/tactile effect. However, in an alternate embodiment of the invention wherein the female fastening strip 131 is provided with a pair of outside wings as mentioned above, the female wings may be positioned to contact a respective outside wing 137 of the male fastening strip 130 when the fastening strips are interlocked. In this embodiment, the step of forming the congruent series of stepped deflections in the interlocked closure elements may induce some compression in one or both of the outer most wing(s) of the male and female closure elements since the wing tip(s) would now have a potential abutment surface against which to act.

Figure 6:
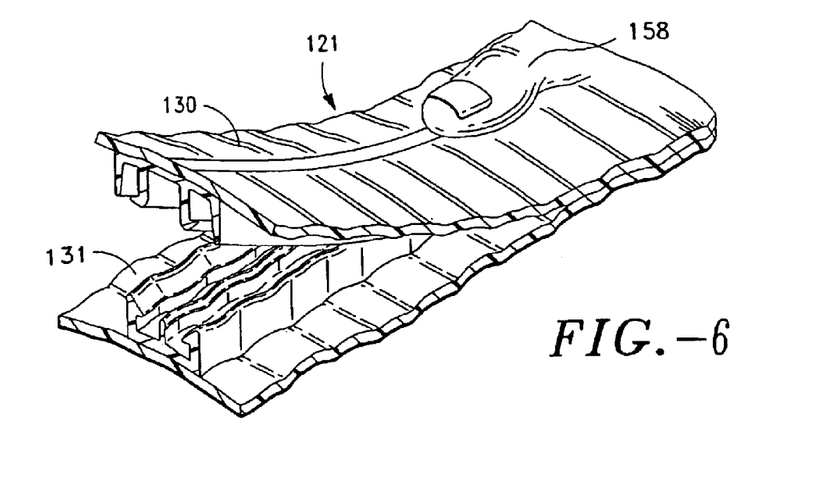
FIG. 6 is an enlarged isometric fragmentary view partly in section, which shows the female closure element of FIG. 4 and the male closure element of FIG. 5 being interlocked by hand.

FIG. 6 shows closure device 121 of one embodiment wherein the male and female fastening strips 130, 131 are being interlocked by hand manipulation in the form of thumb 158.

Figure 7:
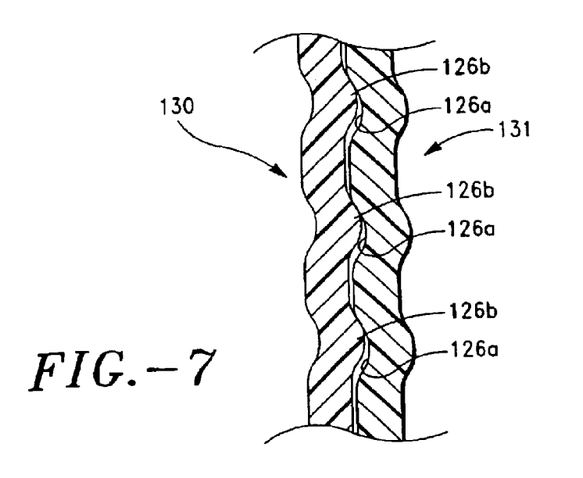
FIG. 7 is an enlarged cross-sectional view taken along reference line 7—7 of FIG. 1.

FIG. 7 illustrates the substantially congruent and interdigitating relationship between the respective series of stepped deflections of the male and female closure elements wherein the formed peaks 126b of the male closure element 136 interdigitate within the formed valleys 126a of the female closure element 134. As noted above, the series of peaks 126b are preferably slightly out of phase with the valleys 126a of the female closure element 134 in order to ensure that a desired amount of interference exists between the two structures so that a desired audible and tactile effect is achieved. The range of interference can be selected to be large or small in order to achieve an audible effect in just one of or both of the opening and closing directions of the interlocking closure device.

Figure 8:
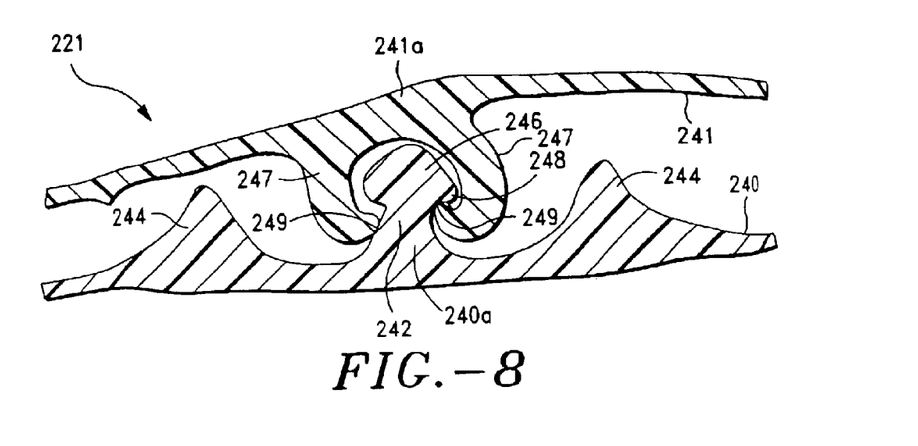
FIG. 8 is a enlarged cross-sectional view similar to that of FIG. 2 only of a second embodiment of the interlocking closure device of FIG. 1 in accordance with the present invention.
Figure 9:
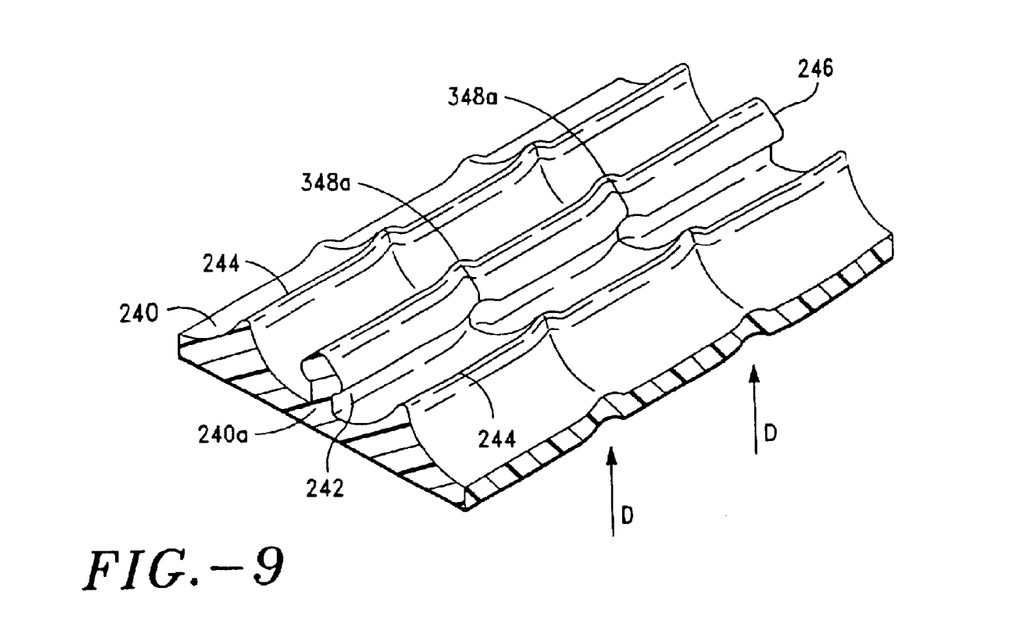
FIG. 9 is an enlarged isometric perspective view partly in section of the male closure element of the interlocking closure device of FIG. 8.
Figure 10:
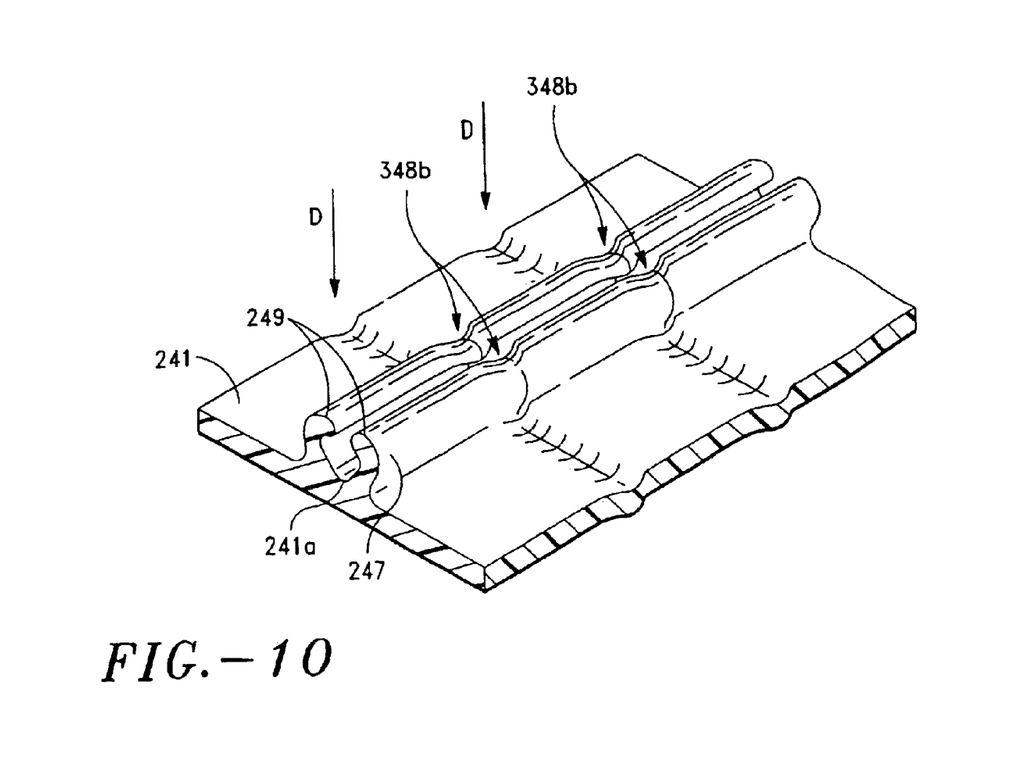
FIG. 10 is an enlarged isometric perspective view partly in section of the female closure element of the interlocking closure device of FIG. 8.

Another embodiment of the present invention is seen in interlocking closure device 221 in FIGS. 8–10. Closure device 221 is an example of a "rib and groove" type zipper closure and comprises opposing longitudinally extending interlockable rib profile 240 and groove profile 241. Rib profile 240 defines a head 246, a stem 242, and one or more ribs 244. Stem 242 and ribs 244 are essentially continuous, and longitudinally extend along profile 240. Head 246 extends longitudinally along profile 240. Rib profile 240 is further defined by a first series of intermittent and preferably alternating stepped deflections. In this example, the stepped deflections are in the form of peaks or protrusions 348a on the rib profile 240. Head 246 is generally bulbous in shape in the regions between the peaks 348a and is slightly more elongate and distorted in regions of the deflected peaks 348a resulting in structural discontinuity along profile 240. The term "bulbous" in this specification includes not only round but also generally arrow-like or triangular-shaped as is commonly seen in the prior art. Stem 242 extends from rib base 240a to define head 246 at its free end. Head 246 includes oppositely disposed outwardly extending hooks 248. Head 246 constitutes a longitudinally extending part of profile 240 interlockable with an essentially continuous and longitudinally extending part of groove profile 241 constituting groove arms 247. Groove arms 247 extend from groove base 241a of groove profile 241. Groove arms 247 straddle head 246 when profiles 240 and 241 are interlocked, and define hooks 249 at their free ends to be engagable and interlockingly coextensive with the hooks 248 of head 246. Groove profile 241 is further defined by a second series of intermittent and preferably alternating stepped deflections in the formed of valleys or indentions 348b. Preferably, the peaks 348a of the bulbous head 246 of the rib profile 240 are in substantially congruent and interdigitating relation with valleys 348b of the groove profile 241. The direction of applied force in creating the stepped deflections on the two parts in indicated by arrow D. In an alternative arrangement, the direction of applied force on the two parts is reversed such that the groove profile is defined by a series of peaks or protuberances and the bulbous head of the rib profile is defined by a series of valleys or indentations.

The terms "rib profile" and "groove profile" are used as terms of convenience to describe opposing interlockable male and female zipper profiles, and are not to be construed as limiting.

Although several interlocking fastening strip embodiments have been specifically described and illustrated herein, it will be readily appreciated by those skilled in the art that other kinds, types, or forms of fastening strips can alternatively be used without departing from the scope or spirit of the present invention. The disclosed embodiments of the present invention are not to be construed as limiting. The art is replete with interlocking closure devices, zippers, and reclosable fasteners of different structures and configurations adaptable to thermoplastic bags. Examples of this art are seen in U.S. Pat. No. 4,363,345, U.S. Pat. No. 4,561,109, and U.S. Pat. No. 4,528,224. Prior art zipper structures can readily be modified in accordance with the present invention to form a zipper having the desired audible clicking and/or vibratory and bumpy feel which is tactile and perceptible to the touch.

When the fastening strips are used in a sealable bag, the fastening strips and the films that form the body of the bag may be conveniently manufactured from heat sealable material. In this way, the bag may be economically formed by using an aforementioned thermoplastic material and by heat sealing the fastening strips to the bag. For example, the bag may be made from a mixture of high pressure, low-density polyethylene and linear, low-density polyethylene.

The fastening strips may be manufactured by extrusion through a die or other known methods and may be formed from any suitable thermoplastic material including, for example, polyethylene, polypropylene, nylon, or the like, or from a combination thereof. Thus, resins or mixtures of resins such as high-density polyethylene, medium-density polyethylene, and low-density polyethylene may be employed to prepare the interlocking fastening strips. For example, the closure device may be manufactured as individual fastening strips for later attachment to the bag or may be manufactured integrally with the bag. In addition, the fastening strips may be manufactured with or without flange portions on one or both of the fastening strips depending upon the intended use of the fastening strips or expected additional manufacturing operations.

Generally, the fastening strips can be manufactured in a variety of forms to suit the intended use. The fastening strips may be integrally formed on the opposing sidewalls of the container or bag, or connected to the container by the use of any of several known methods. For example, a thermoelectric device may be applied to a film in contact with the flange portion of the fastening strips or the base portion of fastening strips having no flange portion, to cause a transfer of heat through the film to produce melting at the interface of the film and a flange portion or base portion of the fastening strips. Suitable thermoelectric devices include heated rotary discs, traveling heater bands, resistance-heated slide wires, and the like. The connection between the film and the fastening strips may also be established by the use of hot melt adhesives, hot jets of air to the interface, ultrasonic heating, or other known methods. The bonding of the fastening strips to the film stock may be carried out either before or after the film is U-folded to form the bag. In any event, such bonding may be done prior to side sealing the bag at the edges by conventional thermal cutting. In addition, the first and second fastening strips may be positioned on opposite sides of the film. Such an embodiment would be suited for wrapping an object or a collection of objects such as wires. The first and second fastening strips should usually be positioned on the film in a generally parallel relationship with respect to each other, although this will depend on the intended use.

The interlocking closure device may be deformed to include the series of intermittent stepped deflections once the male and female closure elements are interlocked and either before or after the fastening strips are attached to the bag film stock in the case where the closure device is manufactured separately from the bag. In the case where the closure device is formed integral with the bag sidewalls, the closure device is deformed after the male and female closure elements are interlocked.

The means for providing the male and female fastening strips 130, 131 preferably comprises an extruder (not shown) and a die means (not shown) to shape the profiles of the male and female closure elements or profiles of the fastening strips as is commonly known in the art. The means for providing the male and female fastening strips may also comprise a means for advancing the fastening strips.

Figure 11:
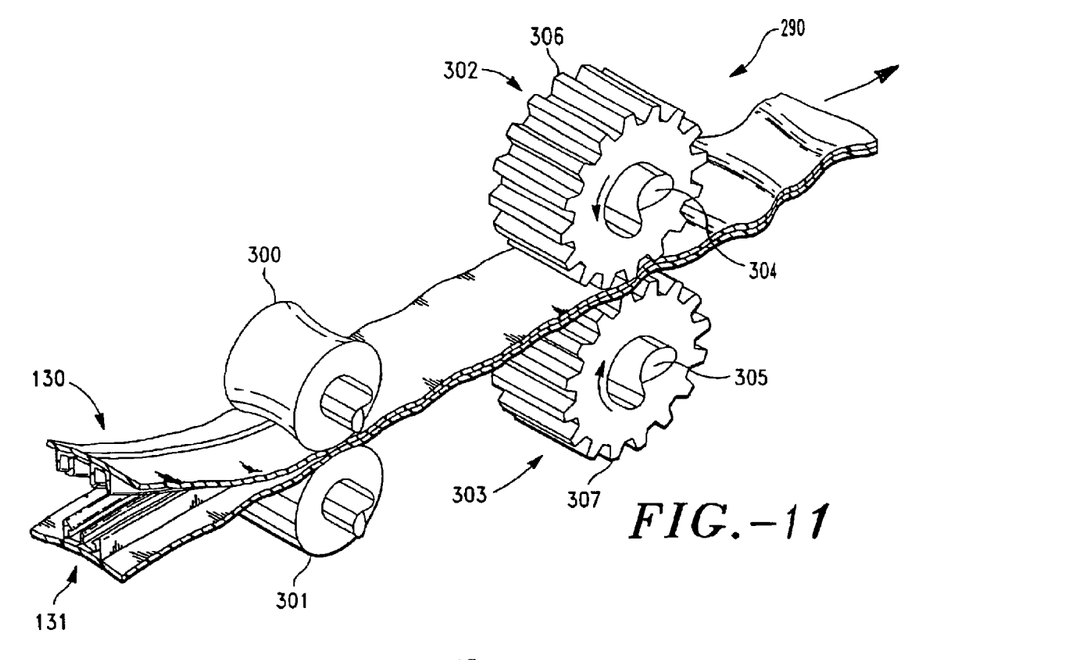
FIG. 11 is an isometric view of a deforming apparatus according to the present invention wherein a mating pair of interlocked closure elements are being processed therethrough and shown fragmentarily.
Figure 14:
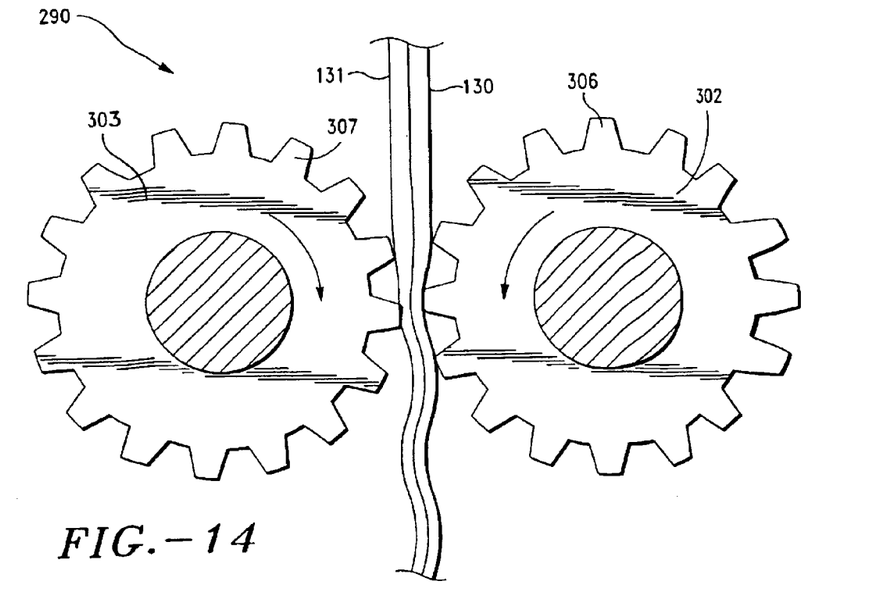
FIG. 14 is an enlarged side view of the interlocked closure profiles being processed through the deforming apparatus of FIG. 11.

A means of deforming the interlocked fastening strips 130, 131 is shown in FIGS. 11 and 14, and is referred to hereafter as deforming apparatus 290. The deforming apparatus 290 creates the stepped deflections (i.e., peaks and valleys) in the areas of contact between the male and female closure elements as shown in FIGS. 4–6 and 9–10 and also the compression in the web portions underlying the valleys as best shown in FIG. 3. Prior to being deformed, the fastening strips 130, 131 are first interlocked. The means for interlocking the opposing male and female fastening strips may take the form of juxtapositioned closing rollers 300, 301 as commonly known in the art. The opposing male and female closure elements or profiles of the fastening strips are interlocked as they pass between the closing rollers 300, 301. The opposing closure elements or profiles may also be interlocked by hand as seen in FIG. 6.

Means for advancing the fastening strips 130, 131 preferably comprise a pair of juxtapositioned deforming wheels 302, 303 that are driven by respective rotary members 304 and 305, which act to pull the interlocked fastening strips therebetween by compression as the members 304 And 305 are rotated. Rotary members 304 and 305 may be rotated by mechanical or electromechanical means known in the art (not shown). Other conceivable means for advancing the interlocked fastening strips 130, 131 include mechanized feed and takeup rolls (not shown).

The deforming wheels 302, 303 each include a plurality of radially situated, outwardly projecting teeth 306 and 307, respectively, that are brought into contact with the backsides (i.e., the side of the fastening strip opposite the closure element) of the respective fastening strips 130, 131. The rotary members 304, 305 are positioned with respect to each other so that the teeth 306, 307 of each are spaced apart and are in generally interdigitating alignment with a slight overlap as members 304, 305 are rotated in opposite directions. The deforming wheels 302, 303 are staggered such that the individual teeth 306 of wheel 302 contact and deform the backside of fastening strip 130 in a slight offset overlapping alternating fashion with respect to the point of contact and deformation of the back side of fastening strips 131 as produced by teeth 307 of wheel 303. Preferably, the contact of and deformation caused by the teeth 306, 307 on the respective backsides of fastening strips 130, 131 is done without excising any appreciable amount of material. The alternating and staggered contact of the two sets of teeth 307 and 307 on the respective backsides of the interlocked fastening strips 130, 131 combined to produce the stepped deflections 138 (i.e., the generally congruent peaks and valleys) described above. The alternating slight overlapping pattern of stepped deflections formed in the interlocked fastening strips 130, 131 by the deforming apparatus 207 is best seen in FIG. 14. In the preferred embodiment, the timing is varied to create a certain amount of interference overlap between the congruently formed stepped deflections in the two fastening strips. By adjusting the series of valleys formed in one part to be more or less slightly out of phase with the congruently formed series of peaks in the other part, the loudness and/or tactile effect can be emphasized or de-emphasized accordingly.

In accordance with a preferred embodiment, the fastening strips 130, 131 are cold deformed by the teeth 306, 307. That is, the fastening strips 130, 131 are sufficiently cooled to a point upon exiting the extruder such that they are no longer in a molten or semi molten state prior to entering the deforming wheels 302, 303.

Figure 12:
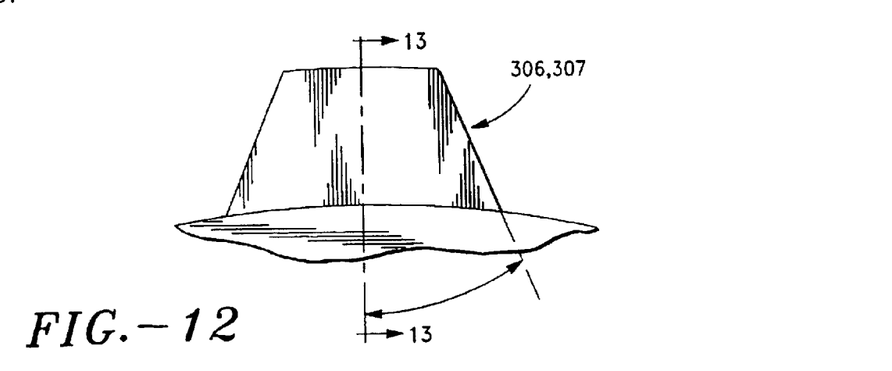
FIG. 12 is a greatly enlarged side view of a tooth of a rotary member of the deforming apparatus of FIG. 11.

Teeth 306, 307 are spaced about deforming wheels 302 and 303 in a pitch corresponding to the desired frequency of stepped deformations on the respective fastening strips 130, 131. The tooth configuration of and spacing between the teeth 306, 307 may be varied as desired to produce a desired audible and tactile effect. For example, it may be desired to have a soft clicking sound at the beginning of the bag and a louder clicking sound at the closing end of the bag. Distinctive and/or repeating audible and/or tactile patterns can also be generated by selectively varying the tooth spacing and tooth configuration. As seen in FIG. 12, the sides of the teeth 306 and 307 may be tapered, with a preferred angle of taper of between 2 to 5 degrees.

Figure 13:
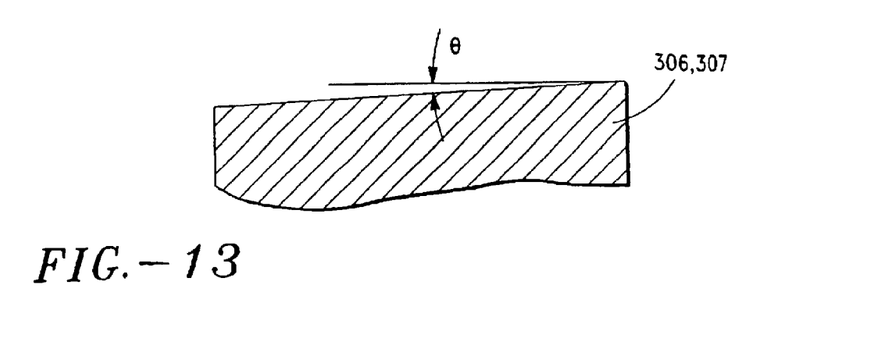
FIG. 13 is a greatly enlarged fragmentary cross-sectional view taken along line 13—13 of FIG. 12.

The fastening strip contacting surfaces of the teeth 306, 306 are preferably tapered in the transverse direction (i.e., parallel to the vertical Z axis 106 of the fastening strips) as shown by angle θ in FIG. 13, with a preferred angle falling with in a range of 8 to 12 degrees. The preferred gap or distance spacing between the gear teeth of opposing deforming wheels in an offset position is 0.010 inch to 0.030 inch. The preferred stitch (stitch being defined as the tooth point to tooth point spacing as seen in FIG. 14) is 0.015 inch to 0.020 inch. The selected angle of taper for the gear teeth sides and the selected angle of taper for the gear teeth contacting surfaces, in combination with the selected tooth height, gap, and provide flexibility in how the compressive force is to be distributed across the closure elements. As noted above, for interlocking closure devices and, in particular, closure devices having closure elements or profiles arranged in U shaped configuration as shown in FIGS. 2–3, it has been found that leak resistance through the closure device is improved where compression is focused only on the outer most web portions 140, 150 of the respective male and female closure elements 136, 134. In accordance with an alternative method for applying a selective compressive force to only the outer most web portions of the occluded fastening strips, rather than tapering the gear teeth, the axis of rotation of one of the deforming wheels may by titled at an angle with respect to the axis of rotation of the juxtaposed deforming wheel. The end result being the same, that is the gear teeth selectively apply more compressive force to the outer most web portions of the occluded fastening strips.

In accordance with an advantageous aspect of the invention, the deforming wheel apparatus may be readily incorporated within an existing interlocking closure bag production line without substantial modification to the existing line.

Figure 15:
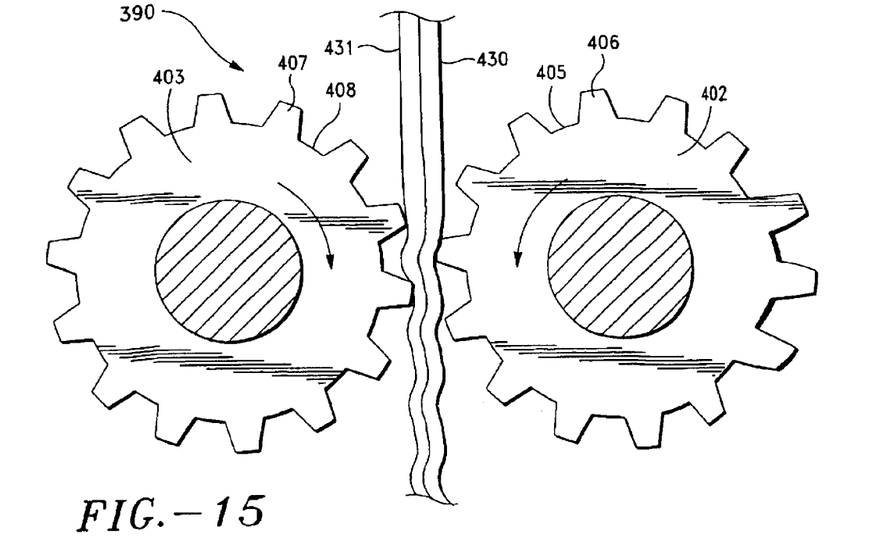
FIG. 15 is an enlarged side view of interlocked closure profiles being processed through a deforming apparatus constructed in accordance with a tooth-to-space embodiment of the present invention.

FIG. 15 illustrates another embodiment of a "tooth to space" deforming apparatus 390, which is similar in most respects to the deforming apparatus 290 discussed above in connection with FIGS. 11–14, except that the gear teeth 407, 407 of respective deforming wheels 402, 403 are offset to a much greater extent such that the gear teeth 406 of deforming wheel 402 align with corresponding valleys 408 of deforming wheel 403. Similarly, gear teeth 407 of deforming wheel 403 align with corresponding valleys 405 of deforming wheel 402. The preferred penetration of the respective gear teeth of the tooth-to-space deforming apparatus is 0.05 inch to 0.10 inch.

Figure 16:
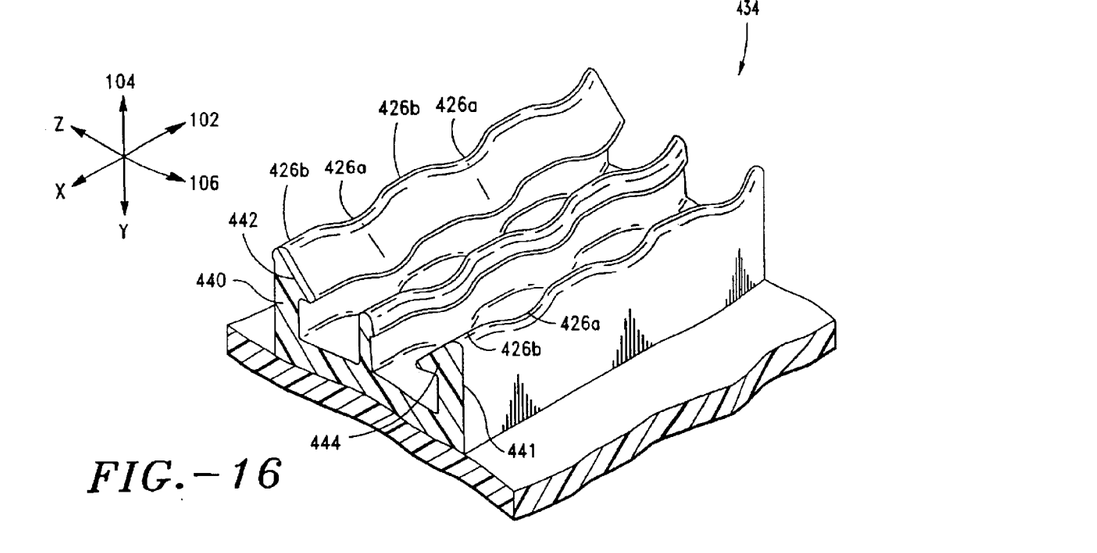
FIG. 16 is an enlarged isometric fragmentary view partly in section of the female closure element of the interlocking closure profile upon deformation by the tooth-to-space deforming apparatus of FIG. 15.
Figure 17:
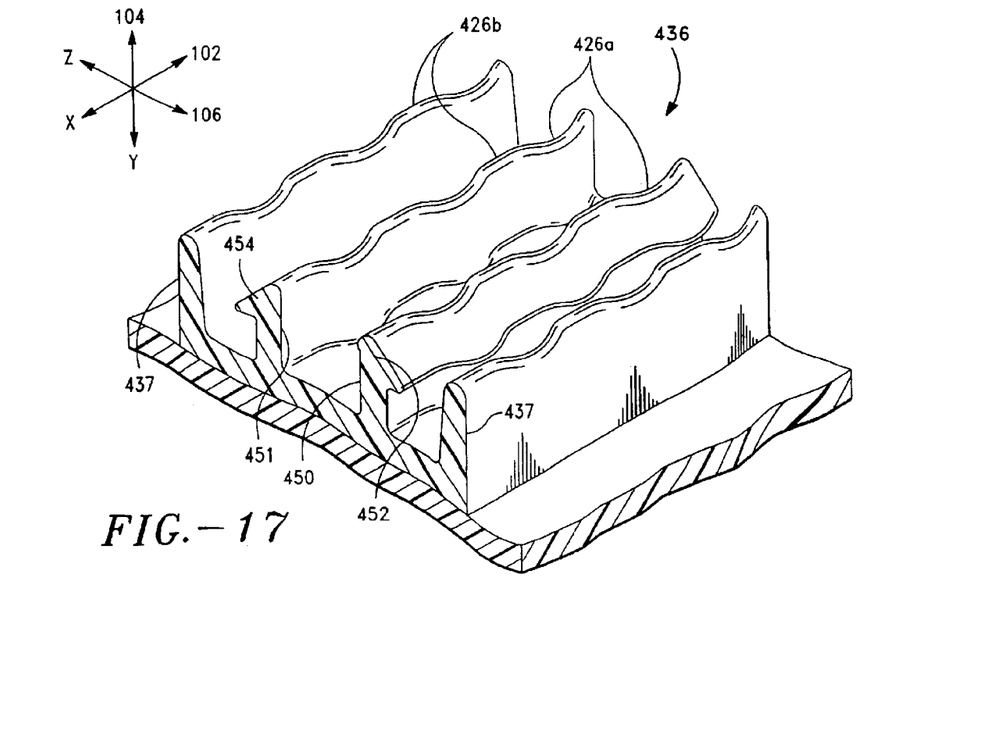
FIG. 17 is an enlarged isometric fragmentary view partly in section of the male closure element of the interlocking closure profile upon deformation by the tooth-to-space deforming apparatus of FIG. 15.

FIGS. 16 and 17 show perspective views of portions of the female closure element 434 and male closure element 436 after undergoing deformation by the "tooth to space", deforming apparatus 390 of FIG. 15. In this embodiment, deformation of the profile pieces occurs along both the transverse Y-axis 104 and the vertical Z-axis 106. In FIG. 16, the deformation induced by the tooth to space deforming apparatus 390 results in a compression of the webs 440, 441 in the transverse Y-axis 104 and the formation of valleys 426a and peaks 426b in respective hook closure portions 442, 444. In addition, the deformation causes the webs 440, 441 to spread or deflect outward along the vertical Z-axis 106. The outward spreading or deflection means that the upper or outermost web 440 leans towards to the top or open end of the bag and the inner or lowermost web 441 leans towards the bottom or closed end of the bag. In other words, as used herein in connection with the description of the "tooth-to-space" embodiment the term "outward spreading" refers to the spreading or bending of the spaced apart webs that occurs relative to the longitudinal center axis of the closure element. Thus the valleys 426a formed in the hook portions 442, 444 have a deformation component along both the transverse Y-axis 104 and the vertical Z-axis 106.

Similarly, in FIG. 17 the tooth-to-space deformation results in a compression of the webs 450, 451 in the transverse Y-axis 104 and the formation of valleys 426a and peaks 426b in respective hook closure portions 452, 454. In addition, the deformation causes the outer web 451 to spread outward or deflect in the same vertical Z-directions along with corresponding outer web 440 of the female closure element 434 (i.e., the outer web 451 is deflected towards the top or open end of the bag). Inner web 450 spreads outwardly or deflects in the vertical Z direction along with corresponding inner web 441 of the female closure element 434 (i.e., the inner web 450 is deflected towards the bottom or closed end of the bag). The wings 437 (depending on their dimension) may also experience some compression in the transverse Y direction and some outward spreading along the vertical Z direction.

Figure 18:
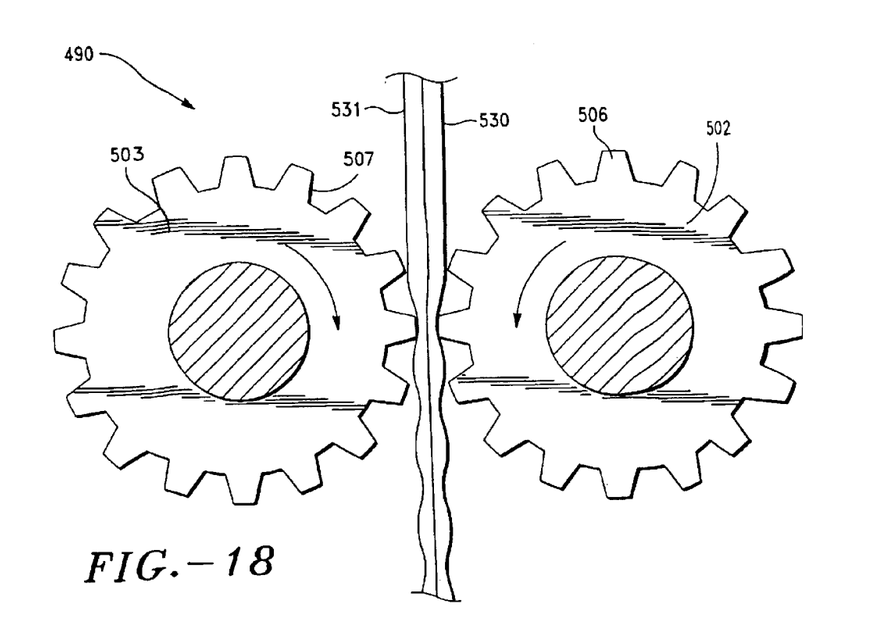
FIG. 18 is an enlarged side view of interlocked closure profiles being processed through a deforming apparatus constructed in accordance with a tooth-to-tooth embodiment of the present invention.

FIG. 18 illustrates another embodiment of a "tooth-to-tooth" deforming apparatus 490, which is similar in most respects to the deforming apparatus 290 discussed above in connection with FIGS. 11–14, except that the gear teeth 506, 507 of respective deforming wheels 502, 503 are aligned to face one another with no appreciable offset. The preferred gap or distance spacing between opposing gear teeth is 0.025 inch to 0.050 inch.

Figure 19:
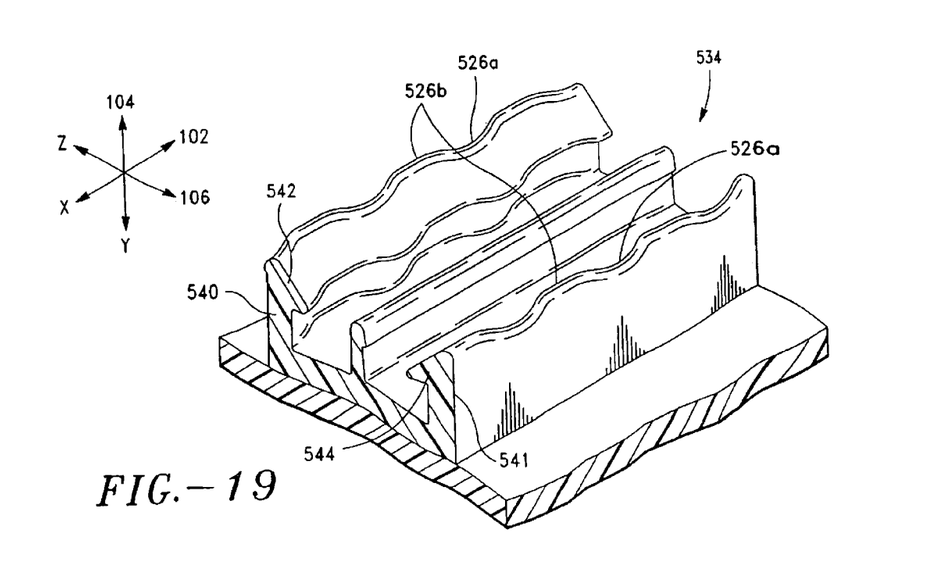
FIG. 19 is an enlarged isometric fragmentary view partly in section of the female closure element of the interlocking closure profile upon deformation by the tooth-to-tooth deforming apparatus of FIG. 18.
Figure 20:
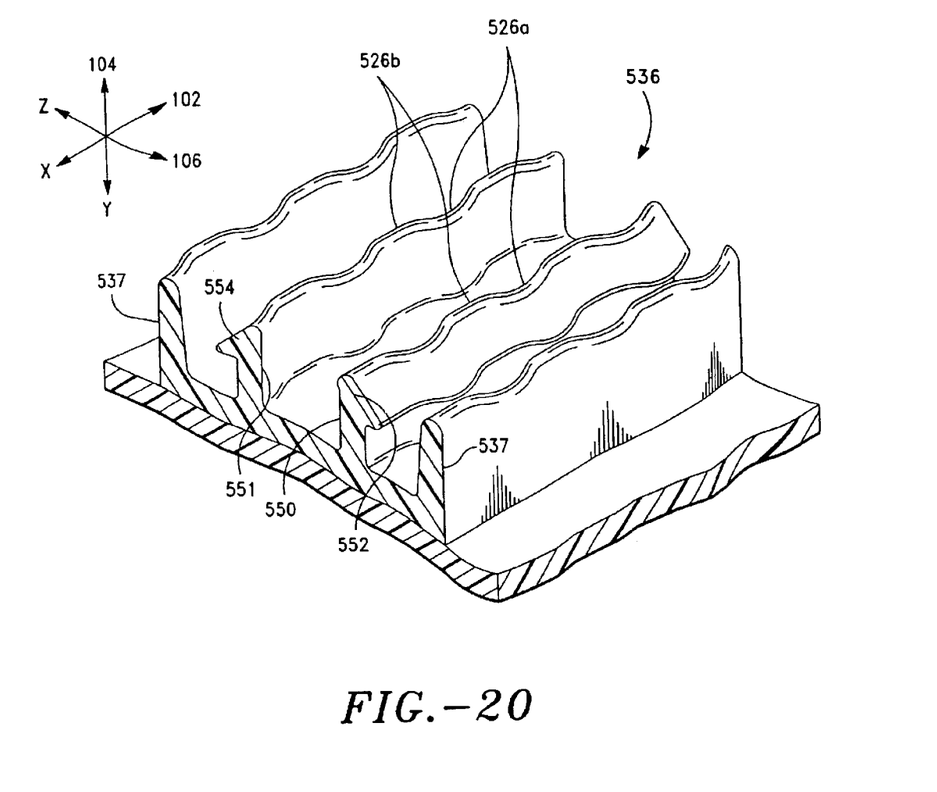
FIG. 20 is an enlarged isometric fragmentary view partly in section of the male closure element of the interlocking closure profile upon deformation by the tooth-to-tooth deforming apparatus of FIG. 18.

FIGS. 19 and 20 show perspective views of portions of the female closure element 534 and male closure element 536 after undergoing deformation by the "tooth to tooth" deforming apparatus 490 of FIG. 18. In this embodiment, the deformation of the profile pieces occurs mostly along the vertical Z-axis 106. In FIG. 19, the deformation induced by the tooth-to-tooth deforming apparatus 490 results in the outward spreading of the webs 540, 541 along the vertical Z-axis 106. The outward spreading causes the upper or outermost web 540 to lean towards to the open end of the bag and the inner or lowermost web 541 leans towards the closed end of the bag.

Similarly, in FIG. 20 the tooth-to-tooth deformation causes the outer web 551 to spread outward in the same vertical Z direction along with corresponding outer web 540 of the female closure element 534. Inner web 550 spreads outwardly in the vertical Z direction along with corresponding inner web 541 of the female closure element 534. The wings 537 (depending on their dimension) may also experience some spreading or deflection in the vertical Z direction.

It is understood that the alternate embodiments described above in connection with FIGS. 15–20 may also include color change enhancement members and the fastening strips may be of different colors in order to effect a color change when the zipper is occluded. In fact, the alternate embodiments for the closure device disclosed in FIGS. 15–20 may include all the same features and have all the same or similar advantages as discussed above in connection with the embodiments shown in FIGS. 1–14.

From the foregoing it will be understood that modifications and variations may be effectuated to the disclosed structures—particularly in light of the foregoing teachings—without departing from the scope or spirit of the present invention. As such, no limitation with respect to the specific embodiments described and illustrated herein is intended or should be inferred. On the contrary, it is intended to cover all alternatives, modifications and equivalents as may be included within the spirit and scope of the invention as defined by the appended claims.

What is claimed is:

1. A process for forming a longitudinally extending interlocking closure device with stepped deflections so that the occlusion and peel force of the closure device is cycled intermittently over the length of the closure device, the process comprising:

extruding first and second fastening strips, said first fastening strip having a male closure element and said second fastening strip have a female closure element;

interlocking said fastening strips such that said male closure element engages said female closure element; and     deforming the fastening strips while interlocked to provide a series of intermittent stepped deflections such that stepped deflections formed in the male closure element are in substantially congruent and interdigitating relation with corresponding stepped deflections formed in the female closure element.

* * * * *